United States Patent [19]

Kumura

[11] Patent Number: 4,846,019

[45] Date of Patent: Jul. 11, 1989

[54] RATIO CONTROL FOR CONTINUOUSLY VARIABLE TRANSMISSION

[75] Inventor: Haruyoshi Kumura, Kamakura, Japan

[73] Assignee: Nissan Motor Co., Ltd., Yokohama, Japan

[21] Appl. No.: 93,836

[22] Filed: Sep. 8, 1987

[30] Foreign Application Priority Data

Sep. 8, 1986 [JP] Japan .................................. 61-209556

[51] Int. Cl.$^4$ ............................................. B60K 41/06
[52] U.S. Cl. ....................................... 74/864; 74/866
[58] Field of Search ................. 74/864, 859, 860, 863, 74/861, 866; 364/424.1

[56] References Cited

U.S. PATENT DOCUMENTS

| | | | |
|---|---|---|---|
| 3,893,344 | 7/1975 | Dontigraber et al. | 74/230.17 |
| 4,458,313 | 7/1984 | Smit et al. | 364/424.1 |
| 4,526,557 | 7/1985 | Tanaka et al. | 74/861 X |
| 4,533,340 | 8/1985 | Abo et al. | 474/28 |
| 4,536,171 | 8/1985 | Tanaka et al. | 74/866 X |
| 4,543,077 | 9/1985 | Yamamuro et al. | 474/12 |
| 4,559,029 | 12/1985 | Miranti, Jr. et al. | 474/251 |
| 4,579,021 | 4/1986 | Yamamuro et al. | 74/869 |
| 4,589,071 | 5/1986 | Yamamuro et al. | 364/424.1 |
| 4,590,561 | 5/1986 | Abo et al. | 364/424.1 |
| 4,597,308 | 7/1986 | Tanaka et al. | 74/866 |
| 4,603,602 | 8/1986 | Tanaka et al. | 74/866 |
| 4,637,277 | 1/1987 | Gaddi | 74/865 |
| 4,637,280 | 1/1987 | Oshiage | 74/866 |
| 4,653,005 | 3/1987 | Osanai et al. | 364/424.1 |
| 4,660,440 | 4/1987 | Matsumura et al. | 74/866 |
| 4,665,775 | 5/1987 | Nagamatsu et al. | 74/868 |
| 4,669,336 | 6/1987 | Okada et al. | 74/867 |
| 4,670,843 | 6/1987 | Matsumura et al. | 364/424.1 |
| 4,698,764 | 10/1987 | Inagaki et al. | 74/866 X |
| 4,702,128 | 10/1987 | Oshiage | 74/866 |
| 4,704,683 | 11/1987 | Osanai | 74/866 X |
| 4,710,879 | 12/1987 | Vahabzadeh | 74/866 X |

FOREIGN PATENT DOCUMENTS

| | | |
|---|---|---|
| 0092227 | 10/1983 | European Pat. Off. . |
| 0093413 | 11/1983 | European Pat. Off. . |
| 0127292A1 | 4/1984 | European Pat. Off. . |
| 0111891 | 6/1984 | European Pat. Off. . |
| 0139277A1 | 10/1984 | European Pat. Off. . |
| 45-11250 | 4/1970 | Japan . |
| 49-103322 | 9/1974 | Japan . |
| 57-161346 | 10/1982 | Japan . |
| 58-170958 | 10/1983 | Japan . |
| 58-170959 | 10/1983 | Japan . |

Primary Examiner—Dwight G. Diehl
Attorney, Agent, or Firm—Foley & Lardner, Schwartz, Jeffery, Schwaab, Mack, Blumenthal & Evans

[57] ABSTRACT

Normally a first target value is given and a reduction ratio of the continuously variable transmission is adjusted in such a direction as to bring the actual value into agreement with the first target value. However, when a predetermined heavy load condition on an engine is detected, a second target value is immediately given and the reduction ratio of the continuously variable transmission is adjusted in such a direction as to bring the actual value into agreement with the second target value. Subsequently, when a deviation of the actual value from the second target value becomes less than a predetermined value, a third target value is given and the reduction ratio of the continuously variable transmission is adjusted in such a direction as to bring the actual value into agreement with the third target value.

6 Claims, 11 Drawing Sheets

RATIO CONTROL FOR CONTINUOUSLY VARIABLE TRANSMISSION

BACKGROUND OF THE INVENTION

The present invention relates to a ratio control for a continuously variable transmission, and more particularly to a ratio control for a continuously variable transmission which is designed to improve acceleration performance.

JP-A No. 59-144849 discloses a ratio control system for a continuously variable transmission. According to this known ratio control system, a target value different from a target value for a stable operating state is set during a transient period. More specifically, an engine revolution speed value determined as a function of a throttle opening degree is continuously set as a target value during the stable operating state. The absolute value of a variation in engine revolution speed is used as a criterion for a judgement as to whether a control for a transition period is required or not. According to the known transition control, the target value is kept equal to an engine revolution speed (hereinafter referred to as an old stable engine revolution speed) determined immediately before the change in throttle opening degree for a predetermined period of time, and upon expiration of the predetermined period of time, the target value jumps by a predetermined amount and increases therefrom gradually toward an engine revolution speed (hereinafter referred to as a new stable engine revolution speed) determined for the new throttle opening degree. With this control, a variation in actual engine revolution speed is smoothed against an irregular variation in throttle opening degree. Thus, a drive feeling and a driveability during a transient period are improved.

If this transient control is carried out when a vehicle driver depresses an accelerator pedal to a kick-down position demanding a rapid acceleration, an increase in engine revolution speed is reluctant, so that an initial response is not good and the drive feeling is poor. According to this transient control, since the gradual increase of the target value takes place immediately after the target value has jumped regardless how much the actual value deviates follow the target value, the actual engine revolution speed deviates considerably from the target value after the vehicle driver has depressed the accelerator pedal to the kick-down position at hill climbing, so that a smooth acceleration is not expected and thus a drive feeling is poor.

JP-A No. 59-144850 discloses a ratio control for a continuously variable transmission. According to this known ratio control, with the same throttle opening degree, different target engine revolution speed values are given for different vehicle speeds in order to improve the drive feeling and driveability over a wide range of vehicle speed. Using this target engine revolution speed, at high vehicle speeds, if a vehicle driver depresses an accelerator pedal, an engine revolution speed increases as the vehicle speed increases. At low vehicle speeds, a change in engine revolution speed against a change in throttle opening degree is suppressed.

An object of the present invention is to improve a ratio control for a continuously variable transmission for an automotive vehicle such that an acceleration performance during operation with a heavy load is improved to give a good drive feeling and good driveability.

More specifically, the present invention aims at providing a ratio control for a continuously variable transmission which provides an improved acceleration performance at hill climbing to give a good drive feeling and a good driveability.

SUMMARY OF THE INVENTION

According to the present invention, normally a first target value is given and a reduction ratio of the continuously variable transmission is adjusted in such a direction as to bring the actual value into agreement with the first target value. However, when a predetermined heavy load condition on an engine is detected, a second target value is immediately given and the reduction ratio of the continuously variable transmission is adjusted in such a direction as to bring the actual value into agreement with the second target value. Subsequently, when a deviation of the actual value from the second target value becomes less than a predetermined value, a third target value is given and the reduction ratio of the continuously variable transmission is adjusted in such a direction as to bring the actual value into agreement with the third target value.

The second target value is greater than an old first target value but less than a new first target value. The third target value gradually increases from the second target value to the new first target value. Thus, the continuously variable transmission is downshifted until the actual value approaches sufficiently near the second target value, and subsequently, the continuously variable transmission is further downshifted gradually in such a manner that the actual value follows the third target value until the actual value becomes substantially equal to the new first target value.

DESCRIPTION OF THE EMBODIMENT

Figure 2:
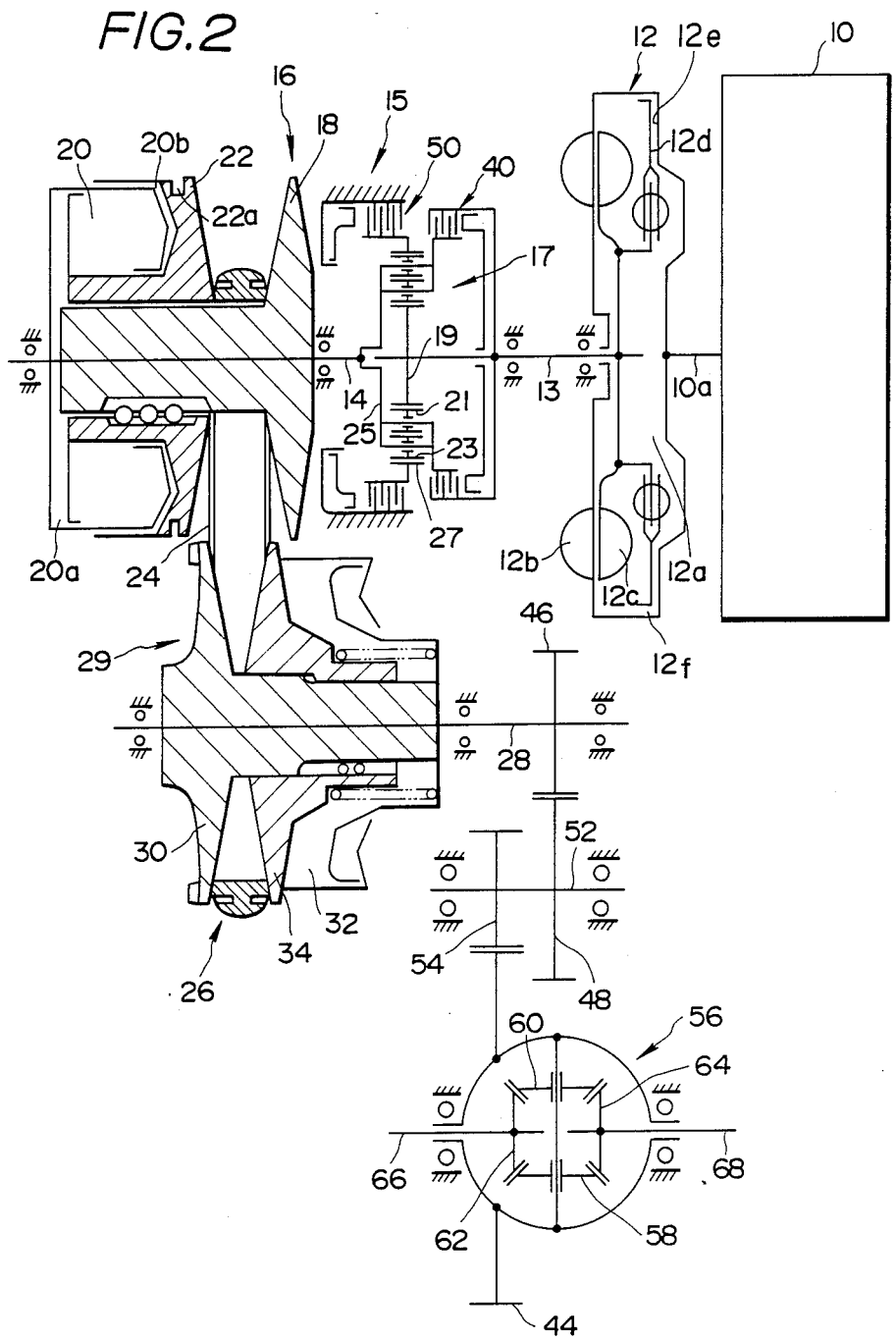
FIG. 2 is a schematic diagram showing a continuously variable transmission.

Referring to FIG. 2, an engine 10 of an automotive vehicle is shown. The engine 10 has an output shaft 10a coupled with a fluid coupling 12 including a pump impeller 12b and a turbine runner 12c, and a lock-up mechanism. The lock-up mechanism includes a friction clutch element 12d rotatable with the turbine runner 12c. The clutch element 12d divides the inside of the fluid coupling 12 into two chambers and defines a lock-up chamber 12a. When it is in the illustrated position in FIG. 2, clutch element 12d is disengaged from the adjacent end wall 12e rotatable with pump impeller 12b. This illustrated position is established when hydraulic fluid is supplied to lock-up chamber 12a. The hydraulic fluid is then allowed to pass through a clearance 12f formed around the outer periphery of clutch element 12d to flow into the inside of fluid coupling 12, i.e., a torous circuit formed by pump impeller 12b and turbine runner 12c. When hydraulic fluid is discharged from lock-up chamber 12a and hydraulic fluid is supplied directly into the inside of fluid coupling 12, there occurs a pressure difference across clutch element 12d urging same into firm engagement with the adjacent wall 12e. The output element of fluid coupling 12 is coupled with a rotary shaft 13. Rotary shaft 13 is coupled with a forward/reverse drive change-over mechanism 15. Forward/reverse drive change-over mechanism 15 has a planetary gearing 17, a forward clutch 40, and a reverse brake 50. Planetary gearing 17 comprises a sun gear 19, a pinion carrier 25 having two pinion gears 21, 23, and a ring gear 27 (also called as an internal gear). Two pinion gears 21, 23 are intermeshed, pinion gear 21 meshes with sun gear 19, and pinion gear 23 meshes with ring gear 27. Sun gear 19 is coupled with rotary shaft 13 for unitary rotation therewith. Pinion carrier 25 is selectively coupled with rotary shaft 13 via forward clutch 40. Ring gear 27 is selectively held to a stationary portion via reverse brake 50. Pinion carrier 25 is coupled with a driver shaft 14 arranged coaxially with rotary shaft 13. Mounted on driver shaft 14 is a driver pulley 16. Driver pulley 16 comprises an axially stationary conical disk (pulley element) 18, and a axially movable conical disk (pulley element) 22 that is arranged in opposed relationship with axially stationary conical disk 18 so as to define a V-shaped pulley groove therebetween and is displaceable in axial direction of driver shaft 14 under bias of hydraulic fluid pressure applied to a driver pulley cylinder chamber 20 (servo chamber). Driver pulley cylinder chamber 20 comprises two chambers 20a and 20b, and has a pressure acting area twice as large as a pressure acting area of a later described follower pulley cylinder chamber 32 (servo chamber). Driver pulley 16 is drivingly connected to follower pulley 26 via a V-belt 24. Follower pulley 26 is mounted on a follower shaft 28. Follower pulley 26 comprises an axially stationary conical disk 30 (follower pulley element) rotatable with follower shaft 28, and an axially movable conical disk 34 that is arranged in opposed relationship with axially stationary conical disk 30 so as to define a V-shaped pulley groove and displaceable in axial follower shaft 28 under the bias of hydraulic fluid pressure applied to a follower pulley cylinder chamber 32. Driver pulley 16, V-belt 24, and follower pulley 26 cooperate with each other to constitute a continuously variable V-belt transmission mechanism 29. Fixedly connected to follower shaft 28 is a driver gear 46 which is in mesh with an idler gear 48 rotatable with an idler shaft 52. Idler shaft 52 has a pinion gear 54 rotatable therewith, the pinion gear being in mesh with a final gear 44. A pair of pinion gears 58 and 60 that form part of a differential 56 are fixedly attached to final gear 44 for rotation therewith. Pinion gears 58, 60 are in mesh with a pair of side gears 62, 64, respectively, which are coupled with a pair of output shafts 66, 68, respectively.

Torque fed to the power transfer mechanism mentioned above by output shaft 10a of engine 10 is transferred via fluid coupling 12 and rotary shaft 13 to forward/reverse drive change-over mechanism 15. Then, the torque is transferred to driver shaft 14 depending upon the state of forward/reverse drive change-over mechanism 15 such that when forward clutch 40 is engaged and reverse brake 50 is released, the torque of rotary shaft 13 is transferred, as it is in terms of amount and direction, to driver shaft 14 via planetary gearing 17, whereas when forward clutch 40 is released and reverse brake 50 is engaged, planetary gearing 17 acts to inverse the direction of torque in transferring it from rotary shaft 13 to driver shaft 14. The torque transferred to driver shaft 14 is transferred via driver pulley 16, V-belt 24, follower pulley 26, follower shaft 28, driver gear 46, idler gear 48, idler shaft 52, pinion gear 54, and final gear 44 to differential 56 where it is translated to rotate output shafts 66, 68 in a forward or reverse direction. It is to be noted that the neutral is established when both forward clutch 40 and reverse brake 50 are released. In the process of the above mentioned torque transfer, the ratio of rotation between driver pulley 16 and follower pulley 26 can be varied by altering the contact radius of driver pulley 16 with V-belt 24 and that of follower pulley 26 with V-belt 24 via axial displacement of axially movable conical disk 22 of driver pulley 16 and axial displacement of movable conical disk 34 of follower pulley 26. For example, if the width of V-shaped pulley groove of driver pulley 16 is increased and the width of V-shaped pulley groove of follower pulley 26 is decreased, the contact radius of the driver pulley side 16 becomes small whereas that of follower pulley 26 side becomes large. This results in establishing a reduction ratio larger than before. If axially movable conical disks 22 and 34 are displaced in the directions opposite to the directions in which the counterparts displaced in the above mentioned case, a reduction ratio becomes small.

Figure 1A:
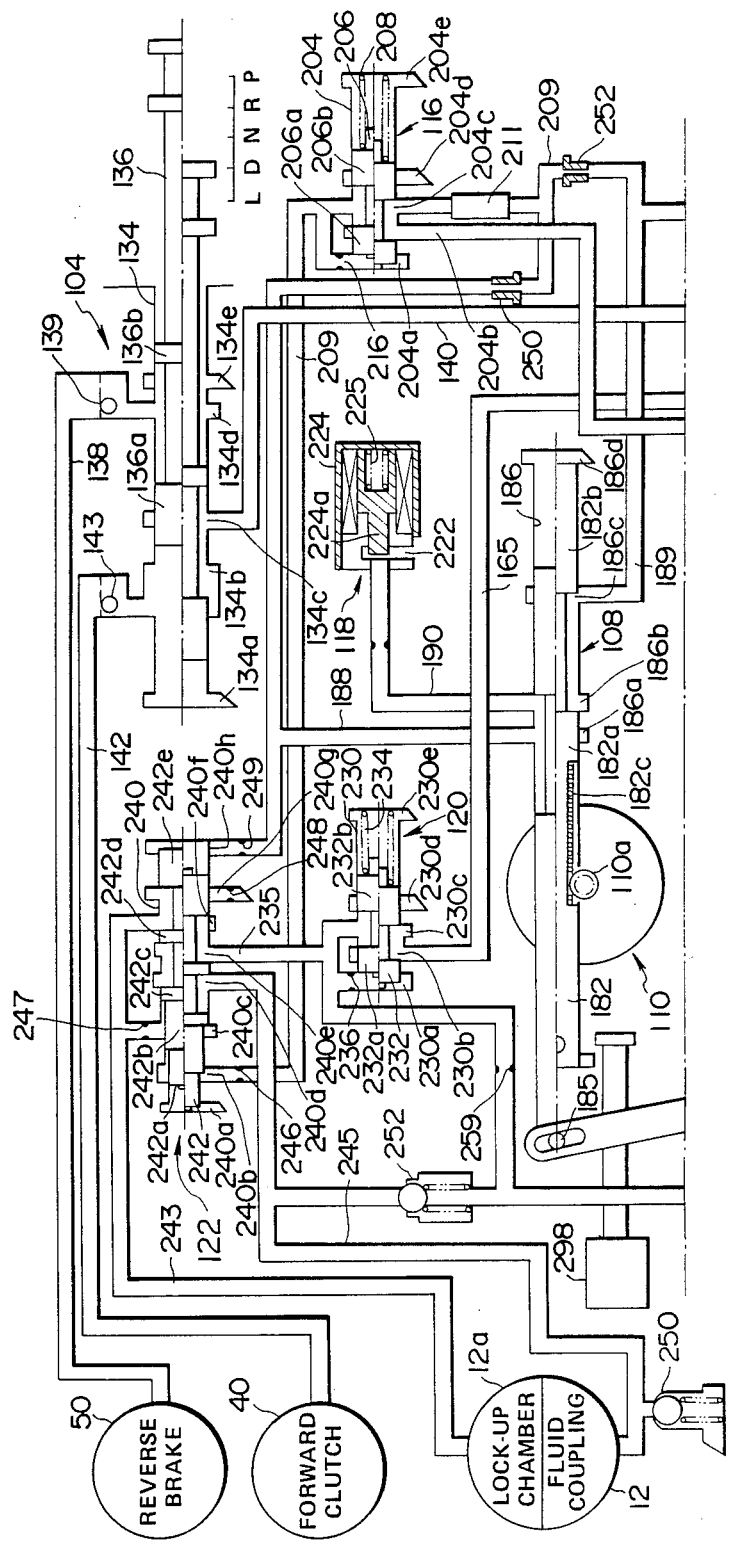
FIGS. 1A and 1B, when combined, are a hydraulic control system for a continuously variable transmission in FIG. 2.
Figure 1B:
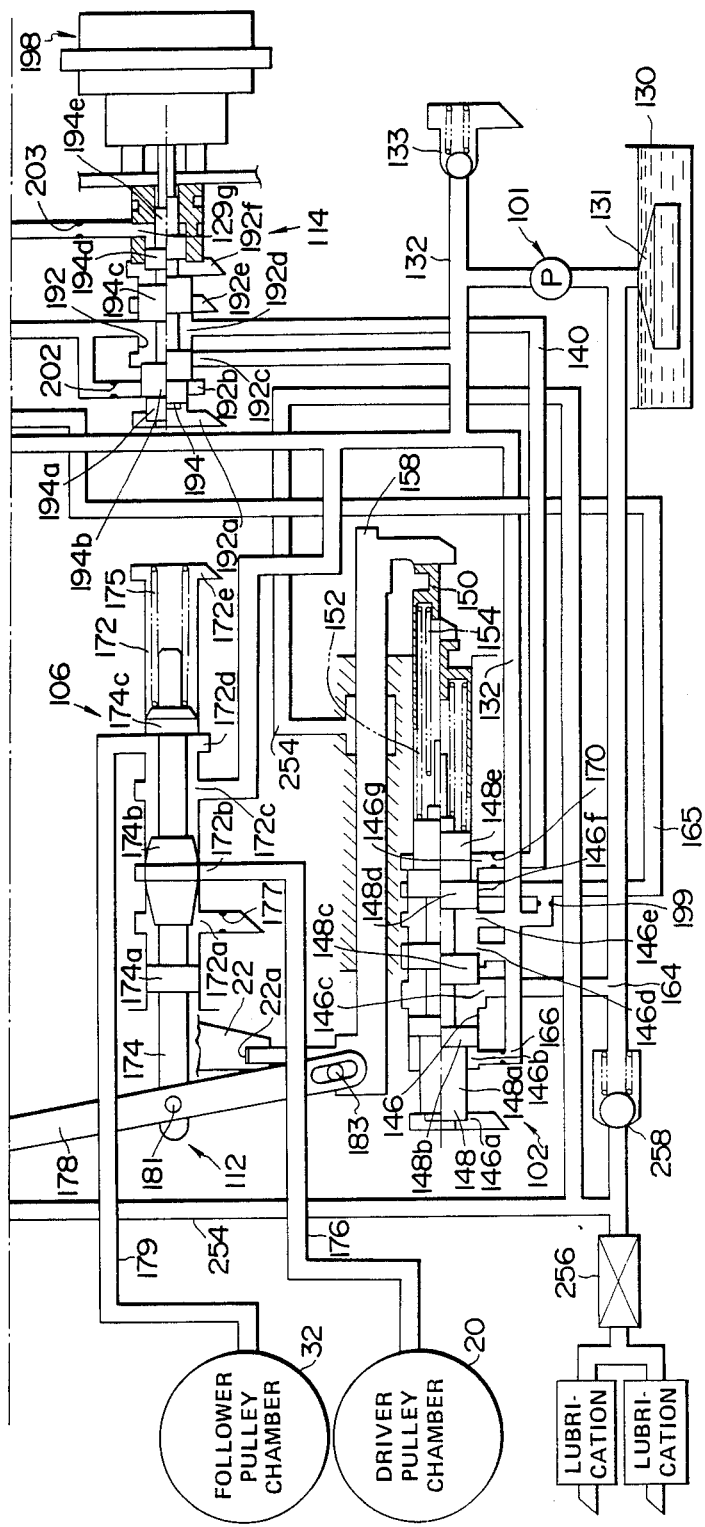

Hereinafter, a hydraulic pressure control device for the above mentioned continuously variable transmission is described. As shown in FIG. 1, the hydraulic pressure control device comprises a hydraulic fluid pump 101, a line pressure regulator valve 102, a manual valve 104, a shift control valve 106, an adjustment pressure change-over valve 108, a shift motor 110, a shift operation mechanism 112, a throttle valve 114, a constant pressure regulator valve 116, an electromagnetic valve 118, a coupling pressure regulator valve 120, and a lock-up control valve 122.

Hydraulic fluid pump 101 draws in hydraulic fluid (oil) from a tank 130 via a strainer 131, and discharges it into hydraulic fluid line 132. Hydraulic fluid line 132 conducts the discharged fluid to ports 146b, 146d and 146e of line pressure regulator valve 102 where pressure regulation is effected to build up a predetermined pressure, i.e., a line pressure which will be described later. Hydraulic fluid line 132 is allowed to communicate with a port 192c of a throttle valve 114 and a port 172c of shift control valve 106, too. Line 132 communicates also with a port 204b of constant pressure regulator valve 116. Provided in fluid line 132 is a line pressure relief valve 133 that prevents abnormal increase in line pressure.

Manual valve 104 has a valve bore 134, formed within a valve body, that is provided with five ports 134a, 134b, 134c, 134d, and 134e, and a spool 136 having two lands 136a and 136b which cooperate with the valve bore. Spool 136 which is urged to move by a selector lever (not shown), has five detent positions, namely P, R, N, D, and L ranges. Ports 134a and 134e are drain ports, and port 134b communicates with forward clutch 40 via hydraulic fluid line 142. Hydraulic fluid line 142 is provided with a one-way orifice 143 that provides a throttling effect only when hydraulic fluid is supplied to forward clutch 40. Port 134c communicates via a hydraulic fluid line 140 with ports 192b and 192d of throttle valve 114, and lastly port 134d communicates via a hydraulic fluid line 138 with reverse brake 50. Hydraulic fluid line 138 is provided with a one-way orifice 139 that provides a throttling effect only when hydraulic fluid is supplied to reverse brake 50. When spool 136 assumes P position, land 136a closes port 134c that is subject to throttle pressure in hydraulic fluid line 140 produced via pressure regulation by the later described throttle valve 114 (clutch pressure regulator valve), forward clutch 40 is drained via hydraulic fluid line 142 and drain port 134a of valve bore 134, and reverse brake 50 is drained via hydraulic fluid line 138 and drain port 134e. When spool 136 assumes R position, ports 134c and 134d are allowed to communicate with each other via a space within the valve bore defined between lands 136a and 136b, and thus reverse brake 50 is supplied with throttle pressure from fluid line 140, whereas forward clutch 40 is drained via port 134a. When spool 136 assumes N position, port 134c is positioned between lands 136a and 136b, and thus it is prevented from communicating with the other ports, whereas ports 134b and 134d are drained, so that, similarly to the situation established when in P position, reverse brake 50 and forward clutch 40 are both drained. When spool 136 assumes D or L position, ports 134b and 134c are allowed to communicate with each other via the space within the valve bore defined between lands 136a and 136b, allowing supply of throttle pressure to forward clutch 40, whereas reverse brake 50 is drained via port 134e. As a result, power transfer is interrupted owing to the release of both forward clutch 40 and reverse brake 50 when spool 136 assumes P position or N position, thus preventing transfer of torque of rotary shaft 13 to driver shaft 14, output shafts 66 and 68 are driven in the reverse direction owing to engagement of reverse brake 50 when spool 36 assumes R position, and output shafts 66 and 68 are driven in the forward direction owing to engagement of forward clutch 40 when spool 136 assumes D or L position. As will be understood from the above description, there occurs no difference in terms of hydraulic pressure circuit between D position and L position, but a difference in position between them is electrically detected for use in controlling a shift motor 110 later described in shifting the transmission in accordance with different shift patterns.

Line pressure regulator valve 102 has a valve bore 146, formed within the valve body, that is provided with seven ports 146a, 146b, 146c, 146d, 146e, 146f, and 146g, and a spool 148 having five lands 148a, 148b, 148c, 148d, and 148e which cooperate with valve bore 146, a sleeve 150 axially movable within valve bore 146, and two coaxially arranged springs 152 and 154 that are disposed between spool 148 and sleeve 150. Sleeve 150 in abutting engagement with a bias member 158 is urged to move to the left as viewed in FIG. 1 in response to leftward movement of the bias member 158. Bias member 158 is mounted within the valve body in parallel to the axis of valve bore 146, and it is formed, at the opposite end portion, with an integral arm meshing with a circumferential groove 22a with which axially movable conical disk 22 of driver pulley 16 is formed. Arrangement is such that an increase in reduction ratio causes movement of sleeve 150 to the left as viewed in FIG. 1, whereas a decrease in reduction ratio causes movement of sleeve 150 to the right as viewed in FIG. 1. Among two springs 152 and 154, spring 152 arranged outside has opposite ends thereof always engaged by sleeve 150 and spool 148 and thus is always in its compressed state, whereas spring 154 inside is not compressed until sleeve 150 is moved to the left as viewed in FIG. 1 from a position indicated by the upper half thereof by a predetermined distance. Port 146a of line pressure regulator valve 102 is a drain port. Port 146g is supplied with throttle pressure from hydraulic fluid line 140 that serves as a throttle pressure circuit. Port 146c communicates with hydraulic fluid line 164 that serves as a drain circuit. Ports 146b, 146d, and 146e communicate with hydraulic fluid line 132 that serves as a line pressure circuit. Port 146f communicates via a hydraulic fluid line 165 with a port 230b of coupling pressure regulator valve 120. Hydraulic fluid line 165 communicates with line pressure line 132 via an orifice 199. Inlets to ports 146b and 146g are provided with orifices 166 and 170, respectively. As a result, spool 148 of line pressure regulator valve 102 is subject to two forces directed to the left as viewed in FIG. 1, one due to spring 152 alone (or both of springs 152 and 154) and the other resulting from the fact that hydraulic fluid pressure (throttle pressure) applied to port 146g acts on a differential area between lands 148d and 148e, and it is also subject to a force directed to the right as viewed in FIG. 1 resulting from the fact that hydraulic fluid pressure (line pressure) applied to port 146b acts on a differential area between lands 148a and 148b. Thus, spool 148 effects pressure regulation to provide line pressure by adjusting the amount of drainage of hydraulic fluid from port 146d toward port 146c until equilibrium state is established where the above mentioned forces directed to the left and to the right balance with each other. As a result, line pressure becomes high as reduction ratio becomes large, and it is increased also in response to a rise in throttle pressure applied to port 146g. The adjustment of line pressure in the above mentioned manner meets the demand that gripping force of pulleys applied to V-belt be increased as the reduction ratio becomes large because the engine output torque increases as throttle pressure rises (viz., engine manifold vacuum decreases) and power transfer torque due to friction is to be increased by increasing the V-belt gripping force by pulleys.

Shift control valve 106 has a valve bore 172, formed within the valve body, that is provided with five ports 172a, 172b, 172c, 172d, and 172e, and a spool 174 having three lands 174a, 174b, and 174c which cooperate with valve bore 172, and a spring 175 biasing spool 174 to the left as viewed in FIG. 1. Port 172b communicates via a hydraulic fluid line 176 with driver pulley cylinder chamber 20, and ports 172a and 172e are drain ports. The outlet of port 172a is provided with an orifice 177. Port 172d communicates via a hydraulic fluid line 179 with follower pulley cylinder chamber 32. Port 172c communicates with hydraulic fluid line 132 that serves as a line pressure circuit, and is supplied with line pressure. Left end of spool 174 is rotatably mounted on a lever 178 of shift operation mechanism 112 which is later described by a pin 181 at a generally middle portion thereof. Because land 174b has an axial cross sectional configuration defined by a curved boundary, hydraulic fluid supplied to port 172c line pressure mainly flows into port 172b, but it is partially discharged to port 172a. As a result, hydraulic pressure developed in port 172b is determined by the ratio of amount of incoming flow into this port to amount of discharging flow. Thus, leftward movement of spool 174 causes a decrease in clearance disposed on the discharge side and an increase in clearance disposed on the line pressure side, resulting in an increase in hydraulic pressure developed in port 172b. Usually, port 172d is supplied with line pressure applied to port 172c. Hydraulic pressure at port 172b is supplied via hydraulic fluid line 176 to driver pulley cylinder chamber 20, whereas hydraulic pressure at port 172d is supplied via hydraulic fluid line 179 to follower pulley cylinder chamber 32. As a result, leftward movement of spool 174 causes an increase in hydraulic pressure in driver pulley cylinder chamber 20, resulting in a decrease in width of V-shaped pulley groove of driver pulley 16, and an increase in width of V-shaped pulley groove of follower pulley 26. That is, this causes an increase in contact radius of driver pulley 16 with V-belt 24, and a decrease in contact radius of follower pulley 26 with V-belt 24, thus causing a decrease in reduction ratio. Rightward movement of spool 174 causes the reverse process to take place, thus causing an increase in reduction ratio.

Although, as mentioned before, lever 178 of shift operation mechanism 112 has a middle portion thereof connected to spool 174 by pin 181 and has one end connected to the before mentioned bias member 158 by pin 183, the opposite end of lever 178 is connected to a rod 182 via a pin 185. Rod 182 is formed with a rack 182c that meshes with a pinion gear 110a of shift motor 110. With this shift operation mechanism 112, if pinion gear 110a of shift motor 110 that is subject to control of a shift control unit 300 is rotated in such a direction as to cause rod 182 to move to the right a viewed in FIG. 1, this rightward movement of rod 182 causes lever 178 to swing about pin 183 clockwise, thus urging spool 174 of shift control valve 106 that is connected to lever 178 to move to the right. As described previously, this causes axially movable conical disk 22 of driver pulley 16 to move to the left as viewed in FIG. 1, thus causing an increase in width of V-shaped pulley groove of driver pulley 16 and a decrease in V-shaped pulley groove of follower pulley 26, resulting in an increase in reduction ratio. Because one end of lever 178 is linked to bias member 158 via pin 183, the above mentioned movement of axially movable conical disk 22 causes bias member 158 to move to the left as viewed in FIG. 1, and this leftward movement of bias member 158 causes lever 178 to swing about pin 185 disposed on the other end thereof clockwise. Thus, spool 174 is pulled back to the left, tending to cause a decrease in reduction ratio. In this process, spool 174, driver pulley 16, and follower pulley 26 are stabilized in a reduction ratio providing state corresponding to the rotary position assumed by shift motor 110. If shift motor 110 is rotated in the opposite direction so as to urge rod 182 to the left, this leftward movement of rod 282 causes the associated members to move in a similar manner until they assume a reduction ratio state corresponding to a new rotary position of shift motor 110. (Rod 182 is movable beyond the position corresponding to the maximum reduction ratio and further to the right, as viewed in FIG. 1, into an overstroke range, and movement of rod 182 into the overstroke range activate a change-over detection switch 298, and the output signal of this detection switch is supplied, as an input, to shift control unit 300.) Therefore, if shift motor 110 is actuated in accordance with a predetermined pattern, the reduction ratio varies accordingly, so that it is possible to control shifting in the continuously variable transmission by controlling shift motor 110.

Shift motor 110 (which will be hereinafter referred to as "stepper motor") is controlled so as to assume a rotary position that is determined in correspondence with a pulse number signal determined in shift control unit 300. Shift control unit 300 gives pulse number signal in accordance with a predetermined shift pattern. Adjustment pressure change-over valve 108 has a valve element thereof formed integrally with rod 182 of shift operation mechanism 112. That is, adjustment pressure change-over valve 108 has a valve bore 186, formed within the valve body, that is provided with ports 186a, 186b, 186c, and 186d, and lands 182a and 182b formed on rod 182. Port 186a communicates with a hydraulic fluid line 188. Port 186b communicates with electromagnetically operated valve 118 via a hydraulic fluid line 190. Port 186c communicates with a hydraulic fluid line 189. Port 186d is a drain port. Normally, port 186a and port 186b are allowed to communicate with each other via a space defined within the valve bore between lands 182a and 182b, but when rod 182 is displaced into the overstroke range beyond the maximum reduction ratio corresponding position, port 186a is closed and port 186b is allowed to communicate with port 186c.

Throttle valve 114 (clutch pressure regulator valve) has a valve bore 192, formed in the valve body, that is provided with ports 192a, 192b, 192c, 192d, 192e, 192f, and 192g, a spool 194 having five lands 194a, 194b, 194c, 194d, and 194e, and a vacuum diaphragm 198 that biases spool 194. When intake manifold vacuum is lower than a predetermined value, for example, 300 mmHg, (viz., when intake manifold vacuum is near the atmospheric level), vacuum diaphragm 198 biases spool 194 with a force that is in inverse proportion to the magnitude of vacuum, whereas when the intake manifold vacuum is higher than the predetermined value, it applies no force to spool 194. Port 192a is a drain port, ports 192b and 192d communicate with hydraulic fluid line 140 serving as throttle pressure circuit, port 192c communicates with hydraulic fluid line serving as line pressure circuit, port 192e is a drain port, and port 192g communicates with the before mentioned hydraulic fluid line 189. The inlets to ports 192b and 192g are provided with orifices 202 and 203, respectively. Spool 194 is subject to two forces directed to the left as viewed in FIG. 1, one resulting from the fact that hydraulic fluid pressure applied to port 192g acts on a differential area between lands 194d and 194e and the other by vacuum diaphragm 198, and it is also subject to a force, directed to the right as viewed in FIG. 1, resulting from the fact that hydraulic fluid pressure applied to port 192b acts on a differential area between lands 194a and 194b. Throttle valve 114 effects well known pressure regulation until the above mentioned forces balance with each other by using line pressure applied to port 192c as pressure source and port 192e as a discharge port. As a result, a throttle pressure builds up at ports 192b and 192d which corresponds to the force due to hydraulic pressure applied to port 192g and the force due to vacuum diaphragm 198. Since, in the above mentioned manner, it is adjusted in accordance with engine manifold vacuum, throttle pressure corresponds to engine output torque. That is, if engine output torque becomes large, throttle pressure takes a high value accordingly. Throttle pressure is adjusted also by hydraulic fluid pressure (adjustment pressure) applied to port 192g which will be described later more in detail.

Constant pressure regulator valve 116 has a valve bore 204, formed in the valve body, that is provided with ports 204a, 204b, 204c, 204d, and 204e, a spool 206 having lands 206a and 206b, and a spring 208 biasing spool 206 to the left as viewed in FIG. 1. Ports 204a and 204c communicate with a hydraulic fluid line 209. Port 204b communicates with hydraulic fluid line 132 serving as line pressure circuit. Ports 204d and 204e are drain ports. The inlet to port 204a is provided with an orifice 216. This constant pressure regulator valve 116 effects well known pressure regulation to provide constant hydraulic fluid pressure corresponding to the force of spring 208 in hydraulic fluid line 209. Hydraulic fluid line 209 is connected via a choke type throttle valve 250 with hydraulic fluid line 188 and it is connected via a choke type throttle valve 252 with hydraulic fluid line 189. Hydraulic fluid line 209 is provided with a filter 211.

Solenoid operated valve 118 is so constructed a to adjust the discharge, in amount, of hydraulic fluid from a drain conduit 190 to a drain port 222. The adjustment is made by a plunger 224a biased by a spring 225 toward a closed position where the discharge is prohibited under the control of a solenoid coil 224. Solenoid coil 224 is subject to pulse duty factor control by control unit 300. Since amount of hydraulic fluid discharged is in inverse proportion to amount of current passing through solenoid 224, hydraulic fluid pressure (adjustment pressure) is variable in inverse proportion to the amount of current passing through solenoid 224.

Coupling pressure regulator valve 120 has a valve bore 230, formed in the valve body, that is provided with ports 230a, 230b, 230c, 230d and 230e, a spool 232 having lands 232a and 232b, and a spring 234 biasing spool 232 to the left as viewed in FIG. 1. Ports 230a and 230c communicate with a hydraulic fluid line 235, port 230b is supplied with hydraulic fluid from hydraulic fluid line 165 which is discharged by line pressure regulator valve 102, and ports 230d and 230e are drain ports. The inlet to port 230a is provided with an orifice 236. Coupling pressure regulator valve 120 effects pressure regulation using hydraulic fluid pressure applied to port 230b as a source of hydraulic pressure and provides a constant hydraulic fluid pressure (coupling pressure) corresponding to the force of spring 234. This hydraulic fluid pressure is supplied to hydraulic fluid line 235. This coupling pressure is used as a working pressure within fluid coupling 12, and it is also used to actuate the lock-up mechanism.

Lock-up control valve 122 comprises a valve bore 240, formed in the valve body, that is provided with ports 240a, 240b, 240c, 240d, 240e, 240f, 240g, and 240h, and a spool 242 having lands 242a, 242b, 242c, 242d, and 242e. Ports 240a and 240g are drain ports, port 240b communicates with hydraulic fluid line 209, ports 240c and 240f communicate via hydraulic fluid line 243 with lock-up fluid chamber 12a, port 240d is connected with hydraulic fluid line 245 that communicates with fluid coupling 12. Port 240e is supplied with constant coupling pressure from hydraulic fluid line 235. Port 240h is connected with the before mentioned hydraulic fluid line 188. The inlets to ports 240b, 240c, 240g, and 240h are provided with orifices 246, 247, 248, and 249, respectively. This lock-up control valve 122 controls the supply of hydraulic fluid pressure to fluid coupling 12 and that to lock-up fluid chamber 12a. Spool 242 shifts from one position to another position when the following three forces attain a predetermined relationship, one due to hydraulic fluid pressure (i.e., constant fluid pressure obtained after pressure regulation by constant pressure regulator valve 116) applied to port 240b which acts on a differential area between lands 242a and 242b, another due to hydraulic fluid pressure applied to port 240c which acts on a differential area between 242b and 242c, and the other due to hydraulic fluid pressure applied to port 240h which acts on axial end of land 242e. When spool 242 assumes a lock-up position indicated by the upper half thereof, port 240f is allowed to communicate with port 240g via a space defined in the valve bore between lands 242d and 242e, thus allowing lock-up chamber 12a to be drained via port 240g. In this lock-up position, port 240d is allowed to communicate with port 240e via a space defined in the valve bore between lands 242c and 242d, thus allowing the supply of coupling pressure- generate-d by coupling pressure regulator valve 120 to the inside of fluid coupling 12 via fluid line 245. As a result, the lock-up mechanism assumes the lock-up state. Hydraulic fluid line 245 is provided with a relief valve 250 that prevents application of abnormally high pressure to fluid coupling 12. When, on the other hand, spool 242 assumes a release position indicated by the lower half thereof as illustrated in FIG. 1, port 240e is allowed to communicate with port 240f via a space defined within the valve bore between lands 242d and 242e, thus allowing the supply of coupling pressure to lock-up fluid chamber 12a via hydraulic fluid line 243. Port 240d, in this position, is sealed by lands 242c and 242d. As a result, the lock-up mechanism assumes the release state, thus providing a state where hydraulic fluid is supplied, as working fluid pressure, to the inside of fluid coupling 12 via lock-up fluid chamber 12a past clearance 12f (see FIG. 2). Hydraulic fluid pressure within fluid coupling 12 is kept at a constant value by means of a pressure maintaining valve 252. Hydraulic fluid discharged by pressure maintaining valve 252 is supplied via hydraulic fluid line 254 to a cooler 256 where it is cooled before used for lubrication. Hydraulic fluid line 254 is provided with a cooler pressure maintaining valve 258. Hydraulic fluid discharged by cooler pressure maintaining valve 258 returns via hydraulic fluid line 164 to intake port of hydraulic fluid pump 101. Hydraulic fluid line 254 leads to an area where bias member 158 is slidably engaged with the valve body to lubricate there. Hydraulic fluid line 254 is connected via an orifice 259 with hydraulic fluid line 235 to secure minimal supply of hydraulic fluid.

Hereinafter, the control unit 300 is further described.

Figure 3:
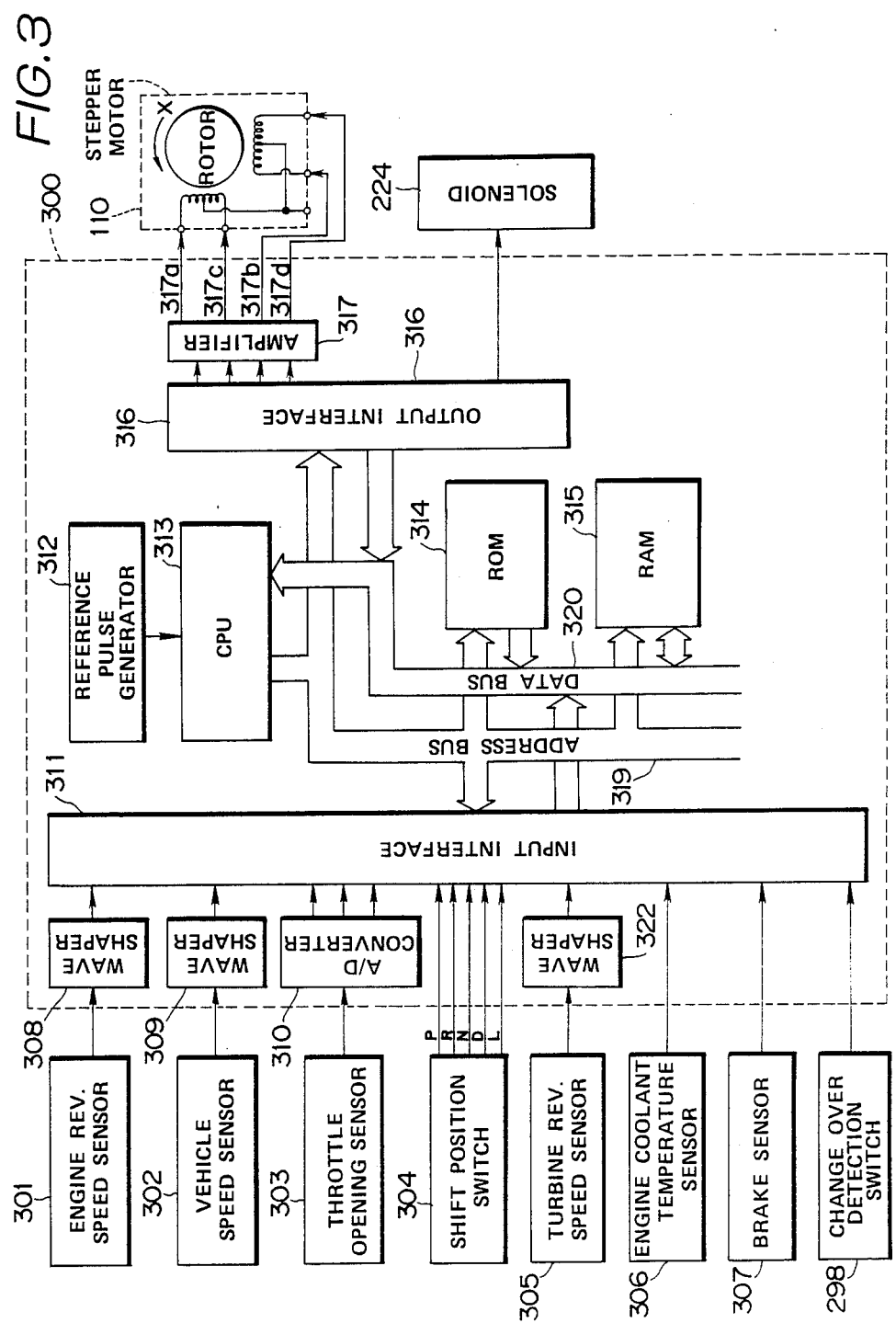
FIG. 3 is a block diagram showing a control unit for the hydraulic control system.

As shown in FIG. 3, the control unit 300 is supplied with electric signals, as input signals, from an engine revolution speed sensor 301, a vehicle speed sensor 302, a throttle opening degree sensor 303, a shift position switch 304, a turbine revolution speed sensor 305, a change-over detection switch 298, an engine coolant temperature sensor 306, and a brake sensor 307. Engine revolution speed sensor 301 detects engine revolution speed by counting the number of engine ignition spark pulses, and vehicle speed sensor 302 detects vehicle speed by measuring rotation of the output shaft of the continuously variable transmission. Throttle opening sensor 303 detects engine throttle opening degree in terms of an electric voltage. Shift position switch 304 detects which of positions P, R, N, D, and L the before mentioned manual valve 104 assumes. Turbine revolution speed sensor 305 detects revolution speed of the turbine shaft of fluid coupling 12. Change-over detection switch 298 is turned ON when rod 182 of shift operation mechanism 112 moves further beyond the maximum reduction ratio corresponding position (i.e., when rod 182 is disposed in the overstroke range). Engine coolant temperature sensor 306 generates an output signal when engine coolant temperature is lower than a predetermined value. Brake sensor 307 detects whether vehicle brake is used. Output signals from engine revolution speed sensor 301, vehicle speed sensor 302, and turbine revolution speed sensor 305 are supplied via associated wave shapers 308 and 309 to an input interface 311. Electric voltage signal from throttle opening sensor 303 is converted into a diginal signal at an AD converter 310 before supplied to input interface 311. The control unit 300 comprises input interface 311, a CPU (central processor unit) 313, a reference pulse generator 312, a ROM (random access memory) 315, and an output interface 316. These elements are interconnected by an address bus 319 and a data bus 320. Reference pulse generator 312 generates reference pulse on which CPU 313 operates. What are stored in ROM 314 include a program for control of stepper motor 110 and control of solenoid 224. RAM 317 temporarily stores information from various sensors and switch and parameters necessary for control. Output signals of shift control unit 300 is supplied via output interface 316 and an amplifier 317 to stepper motor 110 and via input interface 316 to solenoid 224.

Hereinafter, the flowchart is explained.

Figure 4:
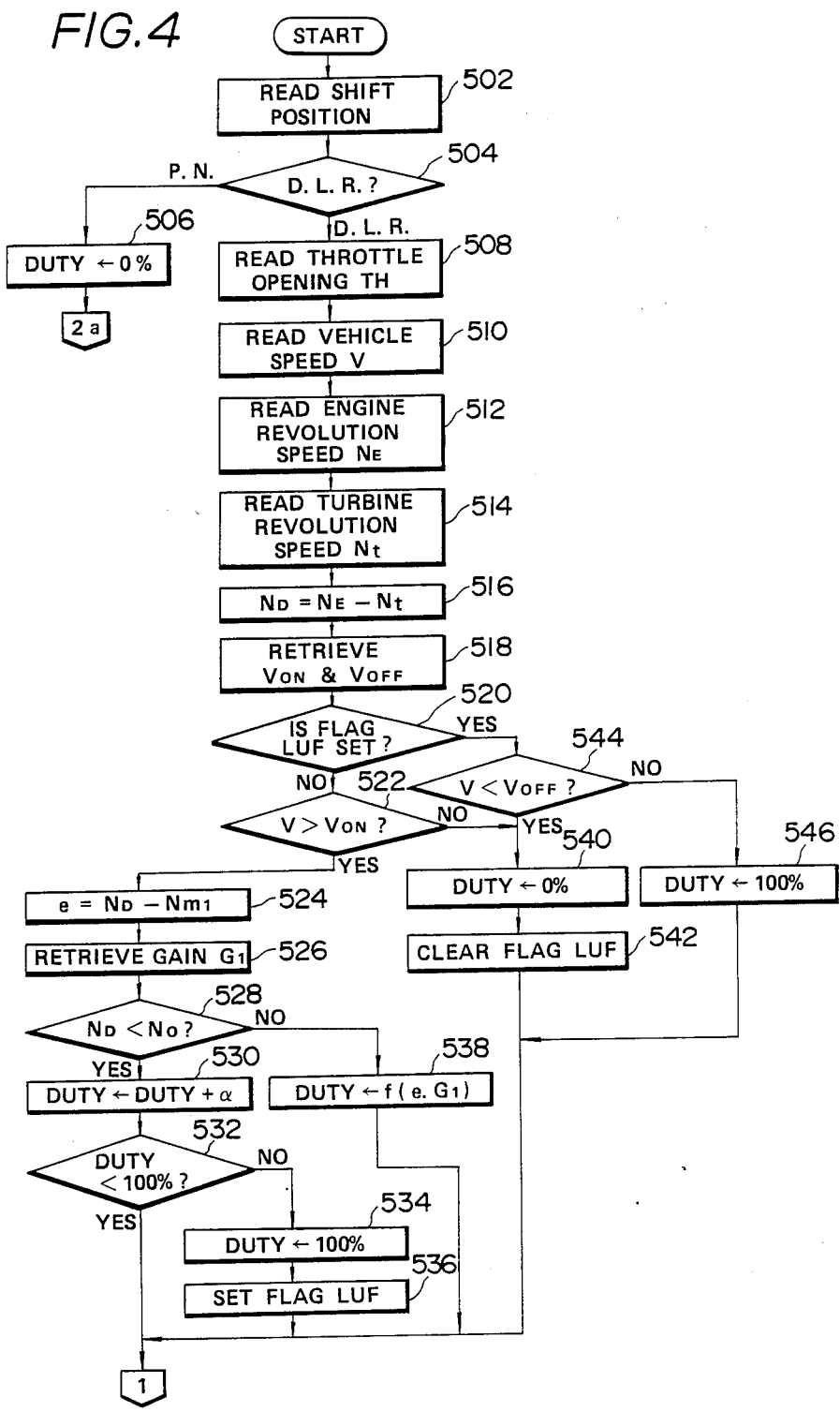
FIGS. 4 to 9 are a flowchart of a control program stored in a ROM 314 of the control unit shown in FIG. 3.

FIG. 4 shows a control routine for controlling the lock-up of the fluid coupling 12 by controlling a duty factor of electric current passing through the solenoid coil 224 of the solenoid valve 118 arranged to isolate a drain conduit 190 from a drain port 222. When the duty factor is zero, no electromagnetic force is created around the plunger 224a so that the plunger 224a assumes a closed position under the bias of the spring 225 where the drain conduit 190 is closed and isolated from the drain port 222. Assuming that the drain conduit 190 is connected to the hydraulic fluid line 188 having one end connected via the choke type orifice 250 to the constant fluid pressure prevailing line 209 and an opposite end connected to the lock-up control valve 122 so as to hydraulically bias a righthand end, as viewed in FIG. 1A, of the spool 242a. Since the drain conduit 190 is blocked and isolated from the drain port 222 when the duty factor of electric current passing through the solenoid coil 224 is set equal to 0%, the constant hydraulic fluid pressure is applied to the righthand end of the spool 242 to bias the spool 242 to a position as indicated by the bottom half thereof against hydraulic bias due to the constant fluid pressure supplied to a lefthand end of the spool 242 via the line 209 and orifice 246 by the constant pressure regulator valve 116. In this position of the spool 242, the coupling pressure from the conduit 235 is supplied via the conduit 243 to the lock-up chamber 12a. As a result, the lock-up of the fluid coupling 12 is released. When the duty factor is set equal to 100%, the electric current continuously passes through the solenoid coil 224, electromagnetically urging the plunger 224a away from the drain conduit 190 allowing communication of the drain conduit 190 with the drain port 222. This causes the hydraulic fluid to be discharged from the hydraulic fluid line 188 and a reduction in hydraulic fluid pressure within the hydraulic fluid line 188 to zero. The spool 242 of the lock-up control valve 122 moves back to a position as indicated by the upper half thereof. In this position of the spool 242, the hydraulic fluid is discharged from the lock-up chamber 12a via the line 243. As a result, the fluid coupling 12 locks up.

Referring back to FIG. 4, an output of the shift position switch 304 is read at a step 502 and a shift position selected is determined by a judgement step 504. If the shift position determined is P (parking) range or N (neutral) range, the duty factor DUTY is set equal to 0% at a step 506. The duty factor 0% is outputted at a step 638 (see FIG. 9) as a solenoid drive signal. This causes the lock-up of the fluid coupling 12 to be released. If the shift position determined at the step 504 is D (drive) range or L (low) range or R (reverse) range, a throttle opening degree TH, a vehicle speed V, an engine revolution speed $N_E$, a turbine revolution speed $N_t$ are read at steps 508, 510, 512, and 514, respectively, from the throttle opening sensor 303, vehicle speed sensor 302, engine revolution speed sensor 301, and turbine revolution speed sensor 305, respectively. At a step 516, a revolution speed difference $N_D$ is given by subtracting $N_t$ from $N_E$. Then, a lock-up ON vehicle speed $V_{ON}$ and a lock-up OFF vehicle speed $V_{OFF}$ are determined by table look-up operation of data maps versus throttle opening degree TH and vehicle speed V. A decision is made at a judgement step 520 whether a flag LUF is set or not. The flag LUF indicates that the fluid coupling 12 locks up. If the flag LUF is not set or cleared, the program proceeds to a step 522 where a decision is made whether vehicle speed V is greater than lock-up ON vehicle speed or not. If $V_{ON}$ is greater than $V_{ON}$, the program proceeds to a step 524 where an error e is given by subtracting a constant $N_{ml}$ from $N_D$ and then to a step 526 where a feedback control gain $G_1$ is determined by retrieval based on the error e given at the step 524. Then, the program proceeds to a step 528 where a decision is made whether the revolution speed difference $N_D$ is less than a predetermined value $N_O$ or not. If $N_D$ is greater than or equal to $N_O$, the program proceeds to a step where the duty factor DUTY is given as a function of e and $G_1$. The content of the duty factor DUTY is outputted at the before-mentioned step 638 (see FIG. 9). The duty factor DUTY is increased as the function of e and $G_1$ until $N_D$ becomes less than $N_O$. When $N_D$ becomes less than $N_O$, the program proceeds from the step 528 to a step where the duty factor DUTY is increased by a predetermined value $\alpha$ (alpha) %. After repeating this step 530 and when the duty factor DUTY becomes equal to or greater than 100%, the program proceeds from a step 532 to a step 534 where the duty factor DUTY is set equal to 100% and then the flag LUF is set at a step 536. It will now be noted that immediately after the vehicle speed V exceeds the lock-up ON vehicle speed $V_{ON}$, the duty factor DUTY is increased toward 100% at a rate determined by the step 538 or 530. Thus, the speed at which the fluid coupling 12 shifts toward the lock-up position is determined by the step 538 or 530. After the flag LUF has been set, the program proceeds from the step 520 to a step 544 where a decision is made whether the vehicle speed V is less than the lock-up OFF vehicle speed $V_{OFF}$. As long as the vehicle speed V is greater than or equal to $V_{OFF}$, the program proceeds from the step to a step 546 where the DUTY is set equal to 100%, whereas when the vehicle speed V drops and becomes lower than $V_{OFF}$, the program proceeds to a step 540 where the duty factor DUTY is set equal to 0% and then to a step 542 where the lock-up flag LUF is cleared. This cause the lock-up of the fluid coupling 12 to be released. After the lock-up flag LUF has been cleared and vehicle speed V has become less than $V_{OFF}$, the program proceeds from the step 520 via the step 522 to the step 540 and then to the step 542.

Figure 5:
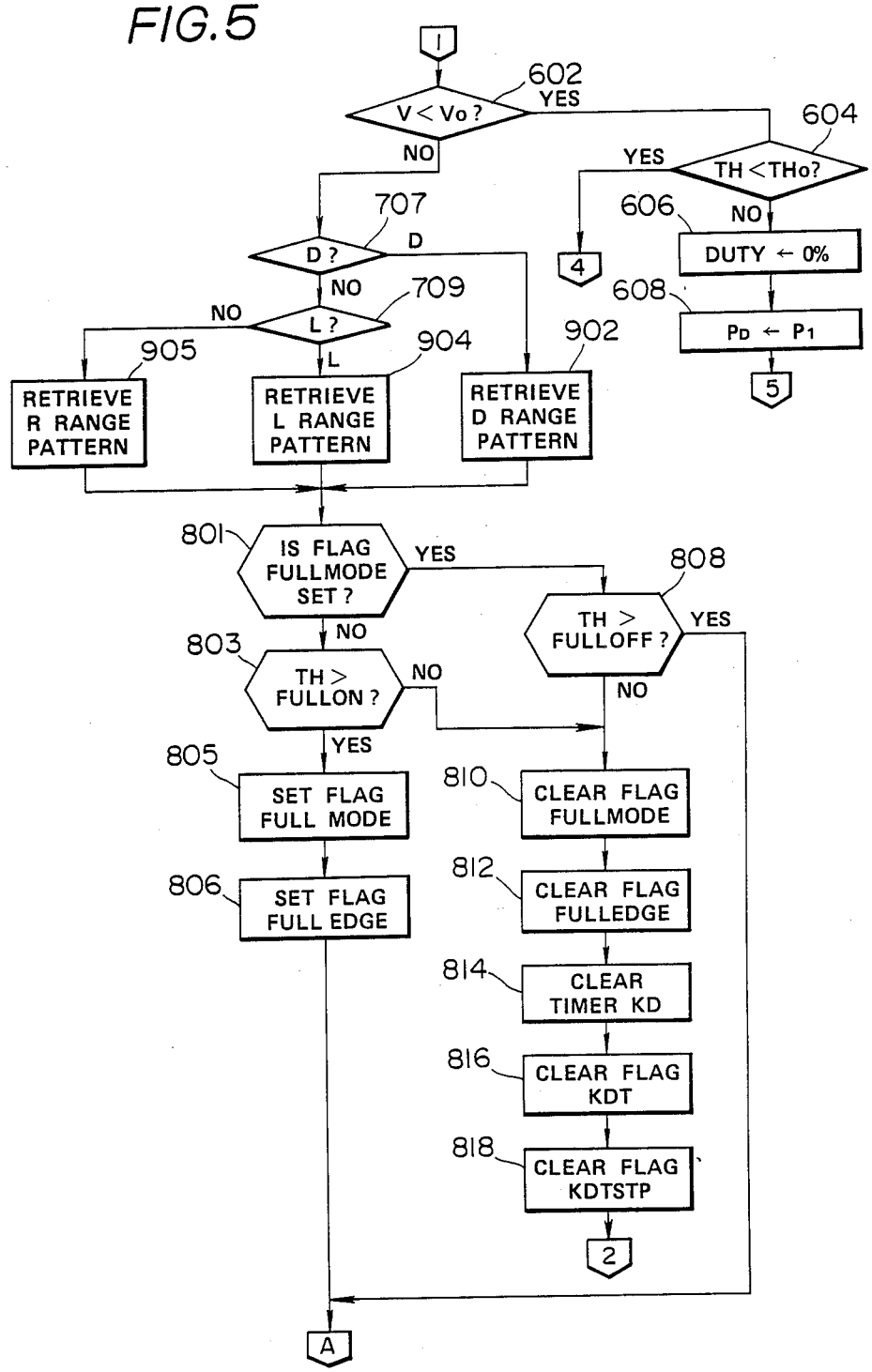

After executing step 532 or 536 or 538 or 542 or 546, the program proceeds to a step 602 shown in FIG. 5. Referring to FIG. 5, at the step 602, a decision is made whether vehicle speed V is less than a predetermined small value $V_O$. The predetermined small value $V_O$ is set equal to 2 km/h or 3 km/h and less than the lock-up ON and lock-up OFF vehicle speeds $V_{ON}$ and $V_{OFF}$. Assuming that the vehicle is at a standstill with the throttle at the idle position, the program proceeds from the step 602 to a step 604 where a decision is made whether throttle opening degree TH is less than a predetermined small value $TH_O$ or not and then to a step 610, shown in FIG. 9, where a decision is made whether the change-over detection switch 298 (see FIG. 1A) is rendered on. Under this condition, the rod 182 of the shift operating mechanism 112 is placed at the overstroke range position as indicated by the lower half portion thereof as illustrated in FIG. 1A and the change-over detection switch 298 is ON, and the spool of the adjustment pressure change-over valve 108 assumes a position as indicated by the lower half thereof where the drain conduit 190 is connected to the hydraulic fluid line 189 having one end connected via the choke type orifice 252 to the constant pressure regulator valve 116 and an opposite end connected to a boost port 129g of the throttle valve 114. Thus, after the step 610, the program proceeds to a step 612 where an error e is given by subtracting a predetermined constant $N_{m2}$ from the revolution speed difference $N_D$, then to a step 614 where a feedback control gain $G_2$ is determined by retrieval based on the error e determined at the step 612, and then to a step 616 where the duty factor DUTY is set as a predetermined function of the error e determined at the step 612 and the feedback control gain $G_2$. Then, the program proceeds to a step 618 where a desired or target pulse number $P_D$ is set equal to 0 (zero). Thereafter, the program proceeds to a step 630 where an actual pulse number $P_A$ is compared with the target pulse number $P_D$ which is equal to 0 under this condition. The stepper motor 110 and thus the rod 182 are moved to predetermined positions corresponding to the pulse number zero after processing along steps 620, 622, 636 and 638 or steps 632, 634, 636 and 638. Since the electric current with the duty factor DUTY determined at the step 616 passes through the solenoid coil 224 of the solenoid valve 118, the hydraulic fluid pressure applied to the boost port 129g of the throttle valve 114 is determined by the duty factor DUTY determined as the predetermined function of the error e (determined at the step 612) and the feedback control gain $G_2$. Thus, the throttle pressure generated by the throttle valve and applied to engage the forward clutch 40 or the reverse clutch 50 is determined by the duty factor DUTY given at the step 616. As a result, the amount of creeping of the vehicle is controlled.

Figure 9:
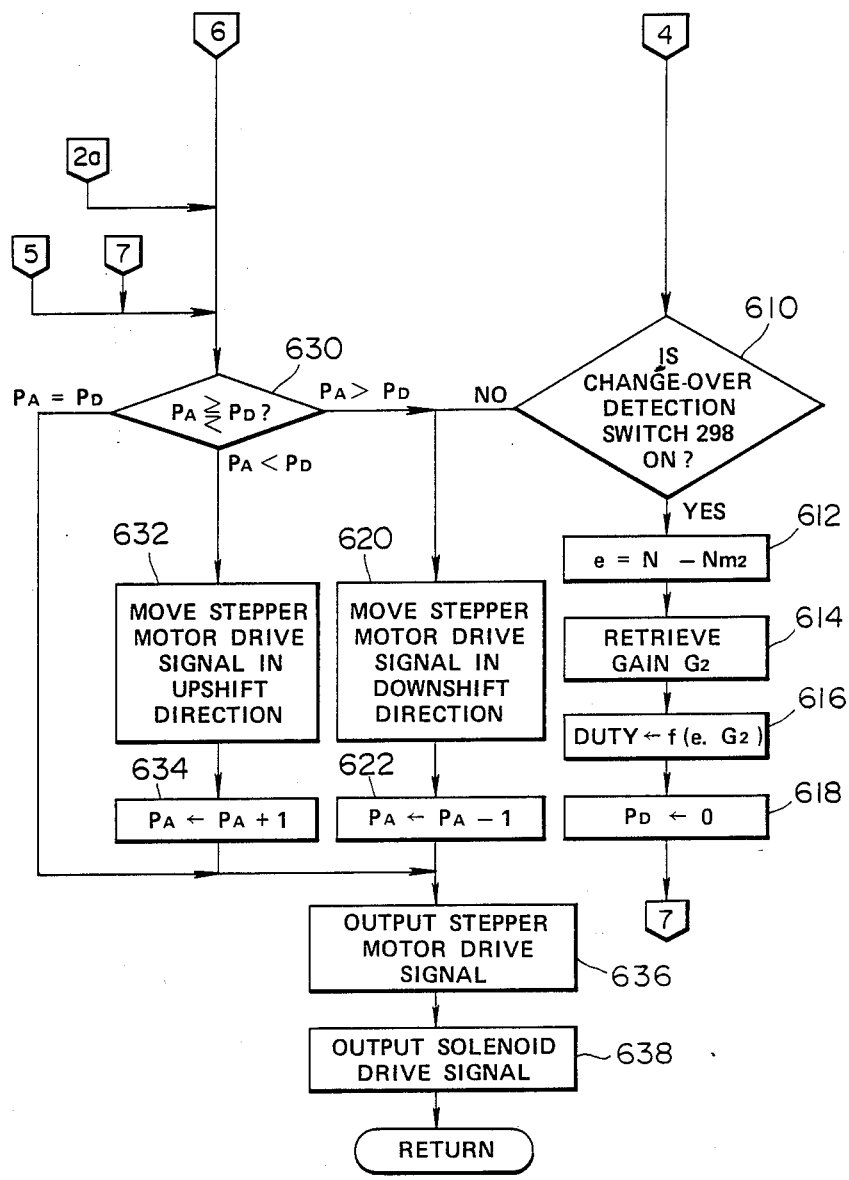

When, under the condition where the vehicle is at a standstill, the throttle opening degree TH is increased and becomes greater than or equal to the predetermined small value $TH_0$, the program proceeds from the step 604 (see FIG. 5) to a step 606, then to a step 608, and then to the step 603 (see FIG. 9). Since the target pulse number $P_D$ is set equal to a predetermined pulse number $P_1$ that is larger than 0 and the duty factor DUTY is set equal to 0%. As a result, the rod 182 is moved to the left as viewed in FIG. 1A from the position as indicated by the lower half thereof to a predetermined position corresponding to the pulse number $P_1$. When the rod 182 is placed at the position corresponding to the pulse number $P_1$, the drain conduit 190 is connected to the hydraulic fluid line 188. Thus, since the drain conduit 190 is closed by the solenoid valve 118, the constant hydraulic fluid pressure is directly applied to the righthand end of the spool 242 of the lock-up control valve 122. This causes the lock-up of the fluid coupling 12 to be released.

Referring to FIG. 5, if the vehicle speed V is greater than or equal to the predetermined value $V_0$, and the D range position is selected, the program proceeds to a step 707 and then to a step 902 where a D range shift pattern data map is retrieved to determine a first target driver pulley revolution speed value and the result is placed at a target driver pulley revolution speed (which may be referred to as a target turbine revolution speed) TRPM. If the L range is selected, the program proceeds via the steps 707 and 709 to a step 904 where a L range shift pattern data map is retrieved to determine the first target driver pulley revolution speed and the result is placed at the target driver pulley revolution speed TRPM. If the R range is selected, the program proceeds via the steps 707 and 709 to a step 905 where a R range shift pattern data map is retrieved to determine the first target driver pulley revolution speed and the result is placed at the target driver pulley revolution speed TRPM. Normally, the stepper motor 110 is adjusted to the corresponding position to the first target driver pulley revolution speed given at one of the steps 902, 904, and 905.

Thereafter, the program proceeds to a step 801 where a decision is made as to whether a flag FULLMODE is set or not. The flag FULLMODE is indicative of whether a transition control according to the present invention is being carried out or not. If the flag FULLMODE is not set and the throttle opening degree TH is less than or equal to a relatively large value FULLON, the program proceeds from the step 801 to the step 630 through steps 803, 810, 812, 814, 816, and 818. Thus, under this operating condition, the stepper motor 110 is adjusted to the target pulse number $P_D$ obtained at the step 902 or 904 or 905. At the step 810, the flag FULLMODE is cleared. A flag FULLEDGE is cleared at the step 812. The flag FULLEDGE is set when the throttle opening degree TH has exceeded the predetermined value FULLON and cleared when the contents of DRPMB and KDTL have been determined after retrieval operations (see steps 822, 824, 826 in FIG. 6). At the step 814, a timer KD is cleared. At the step 816, a flag KDT is cleared. The flag KDT is set when an increment by the timer KD is needed. At the step 818, a flag KDTSTP is cleared. The flag KDTSTP is set when the above-mentioned increment by the timer KD is to be stopped.

If the throttle opening degree TH is greater than FULLON, the program proceeds to a step 805 where the flag FULLMODE is set and to a step 806 where the flag FULLEDGE is set. Then, the program proceeds to a step 820 shown in FIG. 6. After the flag FULLMODE has been set, if the throttle opening degree TH stays greater than another predetermined value FULLOFF that is less than the value FULLON, the program proceeds from the step 801 to a step 808 and then to the step 820. If the throttle opening degree TH becomes less than or equal to the value FULLOFF, the program proceeds from the step 808 to the step 810.

Figure 6:
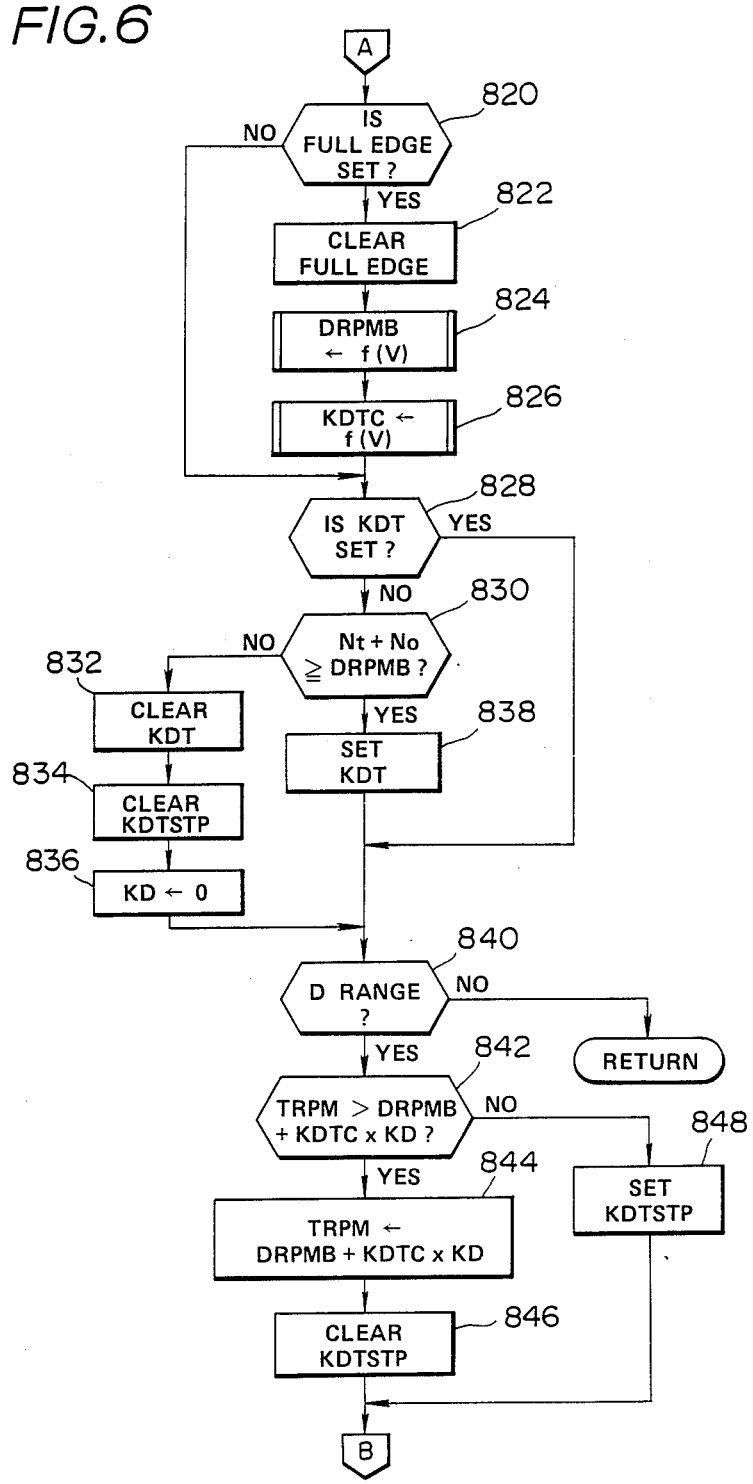

Referring to FIG. 6, a decision is made at the step 820 whether the flag FULLEDGE is set or not. If it is set, the content of the DRPMB is determined (at a step 824), the content of the KDTC is determined (at a step 826) and the flag FULLEDGE is cleared (at a step 822). Thus, after the DRPMB and KDTC has been set, the program passes these steps 822, 824, and 826. At the step 824, the computer performs a table look-up operation of a data map containing data as illustrated by a curve in FIG. 10 and determines DRPMB as a function of the vehicle speed V. At the step 826, the computer performs a table look-up operation of a data map containing data as illustrated by a curve in FIG. 11 and determines KDTC as a function of the vehicle speed V. The content of DRPMB indicates a second target driver pulley revolution speed used in the transient control, and the content of KTDC indicates a term of an equation used in determining a third target driver pulley revolution speed at a step 844.

Then, the program proceeds to a step 828 where a decision is made as to whether the flag KDT is set or not. Initially, the flag KDT is cleared, so that the program proceeds to a step 830. If the actual driver pulley revolution speed $N_t$ increases and a deviation of the actual driver pulley revolution speed from the second target driver pulley revolution speed DRPMB becomes less than a predetermined value $N_O$, the program proceeds from the step 830 to a step 838 where the flag KDT is set. If the deviation of the actual driver pulley revolution speed $N_t$ is still greater than the predetermined value $N_O$, the program proceeds from the step 830 to steps 832, 834, and 836 in this order where the flag KDT is cleared, the flag KDTSTP is cleared and the timer KD is set equal to 0 (zero). If the flag KDT is set, the program proceeds directly to a step 840 passing the steps 830 and 838.

During a phase where the actual driver pulley revolution speed $N_t$ is far less than the second target driver pulley revolution speed DRPMB, the program proceeds along the step 828, 830, 832, 834, 836, 840, 842 to a step 844. At the step, an equation DRPMB+KDTC×KD is calculated and the result is placed TRPM. Since the content of the timer KD is zero (see step 836), the target driver pulley revolution speed TRPM is set equal to the second target driver pulley revolution speed DRPMB. Then, the program proceeds to a step 846 where the flag KDSTP is cleared. If the D range is not selected, the program returns from the step 840 to the step 502 (see FIG. 4). After the step 846, the program proceeds to a step 850 (see FIG. 7) where a decision is made as to whether the flag KDT is set or not. Since the flag KDT has been cleared at the step 832, the program proceeds from the step 850 to a step 908 passing steps 852 and 854. As will now be understood from the preceding description, since the timer KD is equal to 0 (zero) until the actual driver pulley revolution speed $N_t$ satisfies the relationship shown at the step 830, the target driver pulley revolution speed TRPM is set equal to the second target driver pulley DRPMB.

After the actual driver pulley revolution speed $N_t$ has satisfied the relationship shown at the step 830, the flag KDT is set at the step 838. Thus, thereafter, the program proceeds through the steps 828, 840, 842, 844, 846, 850, 852, and 854. Since the increment of timer KD is effected at the step 854, the target driver pulley revolution speed TRPM is set equal to a third target driver pulley revolution speed that is determined by the equation DRPMB+KDTC×KD. It will be noted that the third target driver pulley revolution speed gradually increases from the second target driver pulley revolution speed DRPMB in accordance with the increment of the timer KD.

If, subsequently, the third target driver pulley revolution speed (DRPMB+KDTC×KD) increases and becomes equal to or greater than the first target driver pulley revolution speed TRPM determined at the step 902 (see FIG. 5), the program proceeds from the step 842 to a step 848 where the flag KDTSTP is set, and the first target driver pulley revolution speed determined at the step 902 and placed at TRPM is unchanged. Then, the program proceeds through step 850, 852 to the step 908. The flag KDT is subsequently cleared at the step 816 (see FIG. 5).

Figure 7:
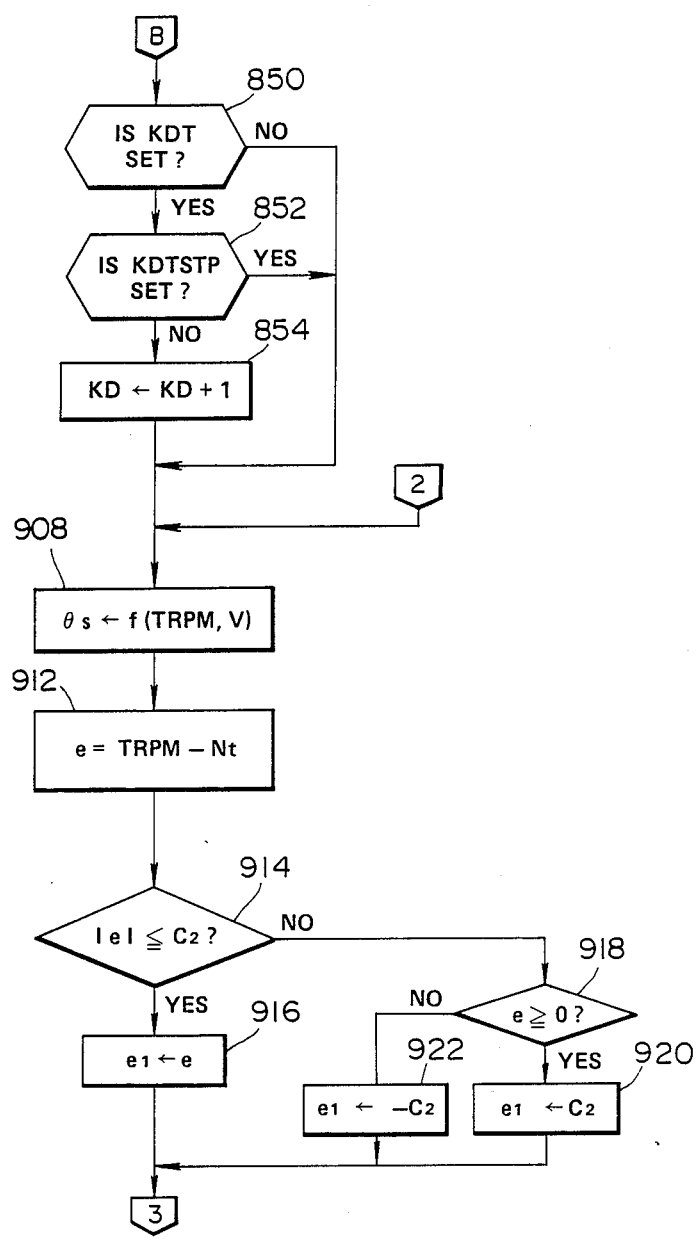
Figure 8:
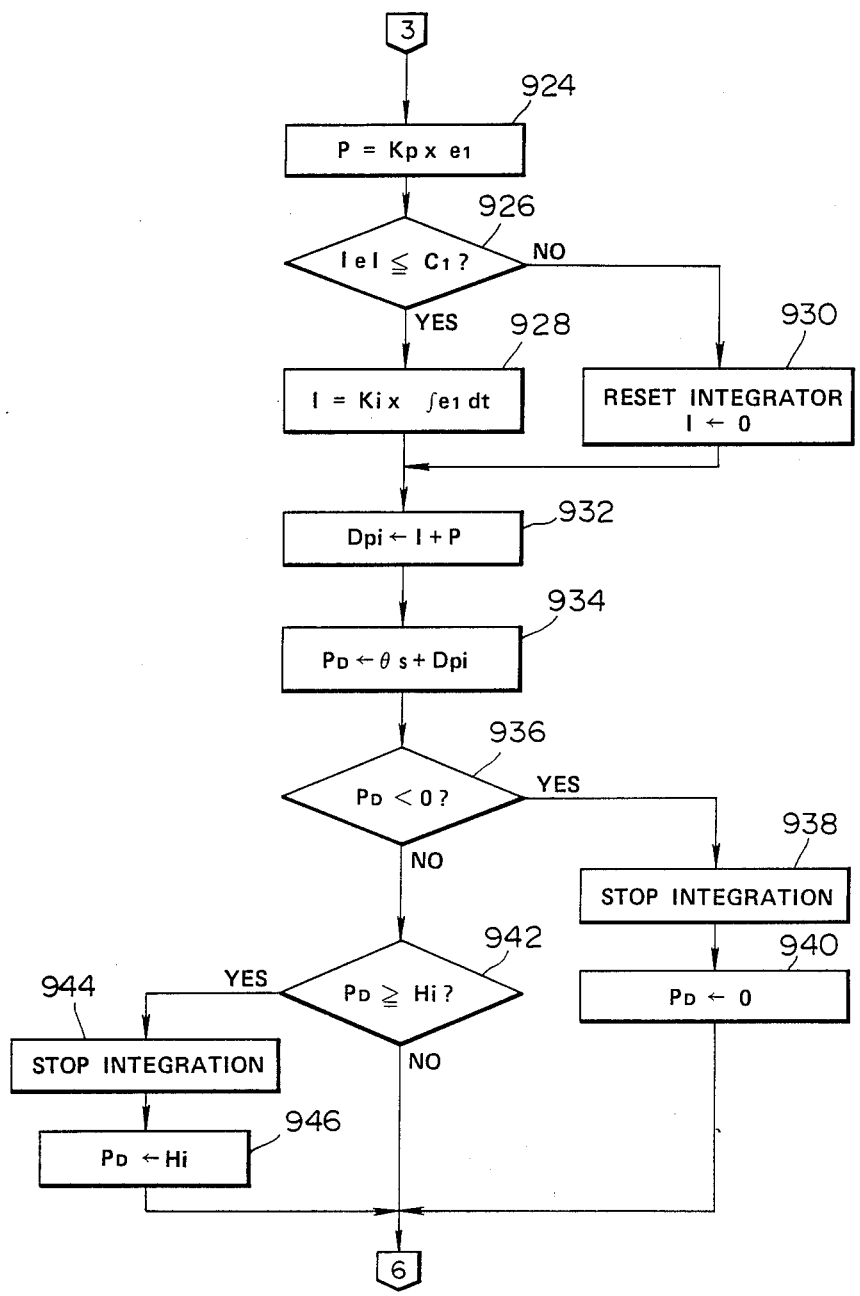

Referring to FIGS. 7 and 8, the target driver pulley revolution speed TRPM which is set equal to the first target driver pulley revolution speed or the second target driver pulley revolution speed or the third target driver pulley revolution speed is translated into the desired pulse number $P_D$ during the process starting with the step 908 and ending with a step 940 or 942 or 946.

At the step 908, a stepper motor operating position $\theta_S$ is determined as a function of TRPM and V (vehicle speed). The value $\theta_S$ is regarded as a feedforward control amount. Then, an error e is determined by subtracting the actual driver pulley revolution speed $N_t$ from the target driver pulley revolution speed TRPM at a step 912. Then, the program proceeds to a step 914 where a decision is made whether an absolute value of the error $|e|$ is less than (inclusive equal to) a predetermined value $C_2$ ($C_2 = 300$ rpm, in the embodiment) or not. If the absolute value $|e|$ is less than or equal to the predetermined value $C_2$, the content of the error e is stored as $e_1$. If the absolute value $|e|$ is greater than the predetermined value $C_2$, the program proceeds to a step 918 where a decision is made whether e is a positive value or a negative value. If e is positive, the predetermined value $C_2$ is set as $e_1$ at a step 920, while, if e is negative, a predetermined value $-C_2$ is set as el at a step 922.

After executing step 916 or 920 or 922, the program proceeds to a step 924 shown in FIG. 8 where a proportional term P of a PI control is determined by multiplying a proportional gain $K_P$ with $e_1$. At a step 926, the absolute value $|e|$ is compared with a predetermined value $C_1$ ($C_1 = 500$ rpm in this embodiment). If the absolute value $|e|$ is less than $C_1$ inclusive, an integral term I of the PI control is determined by calculating an equation $K_i \times e_1$ dt (where: $K_i$ is an integral gain). If the absolute value $|e|$ is greater than the predetermined value $C_1$, the program proceeds to a step 930 where the integral term I is set equal to 0 (zero). That is, the integrator is reset. From the step 928 or 930, the program proceeds to a step 932 where a feedback control amount $D_{pi}$ is determined as the sum of the proportional P and the integral term I. Then, the program proceeds to a step 934 where the feedforward control amount $\theta_S$ is added to the feedback control amount $D_{pi}$ and the result is set as the target pulse number $P_D$. At a step 936, a decision is made whether the target pulse number $P_D$ is less than 0 or not. If the target pulse number $P_D$ is negative, the program proceeds to a step 938 where the addition of the result of integration is stopped and to a step 940 where the target pulse number $P_D$ is set equal to 0. If the target pulse number $P_D$ is greater than 0, the program proceeds to a step 942 where a decision is made whether the target pulse number $P_D$ is greater than a predetermined value Hi or not. This predetermined value Hi indicates a pulse number of the stepper motor 110 which corresponds to the minimum or smallest reduction ratio within an allowable reduction ratio range for the continuously variable transmission. If the target pulse number $P_D$ is greater than the predetermined value Hi inclusive, the addition of the result of integration is stopped at a step 944 and then the target pulse number $P_D$ is set equal to the predetermined value Hi at a step 946. If the target pulse number $P_D$ is less than the predetermined value Hi, the content of the target pulse number $P_D$ determined at the step 934 is unchanged. After the step 940 or 942 or 946, the program proceeds to the step 630 shown in FIG. 9.

Referring to FIG. 9, the target pulse number PD is compared with the actual pulse number $P_A$ at the step 630. If the target pulse number $P_D$ is equal to the actual pulse number $P_A$, the program proceeds to the step 636 and 638 where the stepper motor drive signal and solenoid drive signal (DUTY) are outputted. If the actual pulse number $P_A$ is less than the target pulse number $P_D$, the stepper motor drive signal is moved by one unit in upshift direction at a step 632 and the actual pulse number $P_A$ is increased by 1. Then, the program proceeds to step 636 and 638. If the actual pulse number $P_A$ is greater than the target pulse number $P_D$, the stepper motor drive signal is moved by one unit in downshift direction at a step 620 and the actual pulse number $P_A$ is decreased by 1. Then, the program proceeds to the step 636 and 638.

Figure 10:
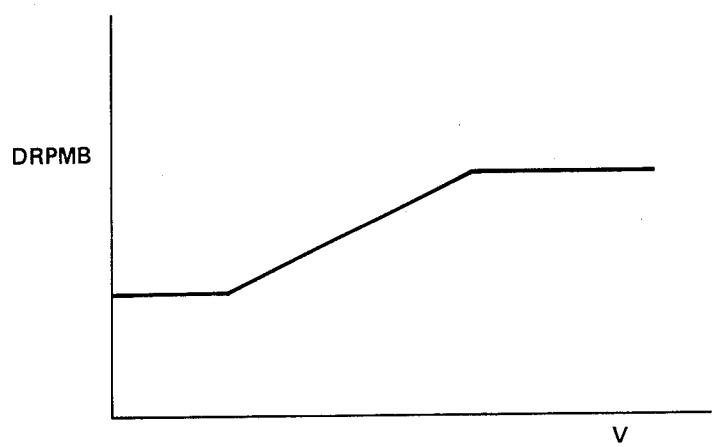
FIG. 10 is a graph showing a preferred variation of DRPME against vehicle speed V.

As will now be understood from the preceding description along with the flowchart, the second target value DRPMB is determined (at the step 824) by retrieving the data FIG. 10 based on the vehicle speed V obtained at the moment when the throttle opening degree TH has exceeded the predetermined value (FULLON). Similarly the increment term KDTC is determined (at the step 826) by retrieving the data FIG. 11 based on the vehicle speed V obtained at the moment when the throttle opening degree TH has exceeded the predetermined value (FULLON). As long as the deviation of the actual driver pulley revolution speed $N_t$ from the second target value DRPMB is greater than the predetermined value (N0), since the timer KD is kept at 0 (at the step 836), the second target value DRPMB is set as the target driver pulley revolution speed TRPM (at the step 844). When the deviation becomes less than the predetermined value ($N_O$), the value resulting from adding the term KDTC×KD to DRPMB is set as the third target value (at the step 844). Since the content of the timer KD gradually increases (step 854), the third target value also gradually increases toward the first target value that is determined at the step 904. However, the third target value will not exceed the first target value (see the step 842).

Assuming that the throttle opening degree TH is increased to the full open position when the vehicle is climbing uphill, the continuously variable transmission is rapidly downshifted until the actual driver pulley revolution speed $N_t$ increases to the value DRPMB - $N_O$, and subsequently it is gradually downshifted further until the actual driver pulley revolution speed approaches the first target value. As a result, a predetermined acceleration power is produced immediately after the throttle valve has been opened to its full open position and then driving torque is gradually increased, providing a good acceleration feeling.

The increment of the timer KD is stopped when TRPM becomes less than DRPMB+KDTC×KD (at the step 842) along processing through the steps 848, 850, 852, and 908. Thus, even if, after the vehicle has been accelerated by depressing the accelerator pedal to for example ⅝ throttle opening degree, the accelerator pedal is depressed further deeply to the full throttle opening position, the target value increases as the time passes so that the actual driver pulley revolution speed is increased accordingly. This provides a good acceleration feeling.

After the deviation of the driver pulley revolution speed $N_t$ from the second target value DRPMB has decreased below the predetermined value $N_O$, the third target value is set and gradually increases as the time passes. As a result, even if the throttle opening degree immediately before the throttle is opened to its fully opened position differs, the same acceleration power and acceleration feeling can be provided. Thus, this meets the acceleration feeling demanded by the driver.

Figure 11:
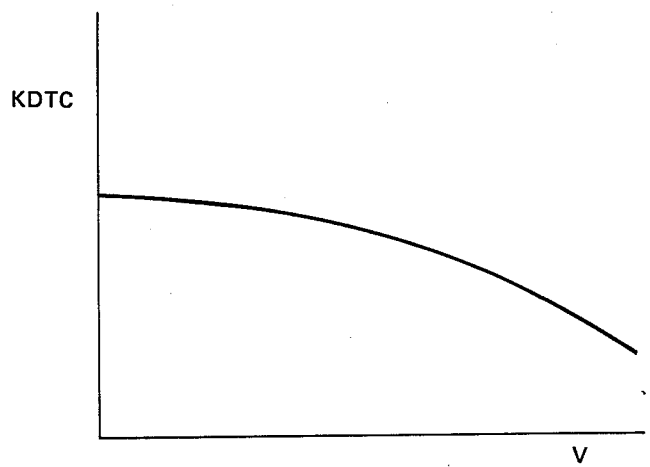
FIG. 11 is a graph showing a preferred variation of KDTC against vehicle speed V.

Since the DRPMB and KDTC are determined in response to the vehicle speed using the data maps as shown in FIGS. 11 and 12, the control system can be easily matched to different automotive vehicles only by replacing the data maps shown in FIGS. 11 and 12.

What is claimed is:

1. A ratio control for a continuously variable transmission for an automotive vehicle having an engine with a throttle, comprising:
   means for detecting load condition on the engine and generating a load condition indicative signal which is indicative of the load condition detected;
   means for detecting an actual value variable with a reduction ratio established in the continuously variable transmission;
   a control unit; and
   means under the control of said control unit for adjusting the reduction ratio of the continuously variable transmission in such a direction as to bring said actual value into agreement with a target value; wherein
   a first value that is variable with said load condition indicative signal is normally set as said target value.
   when said load condition indicative signal is subject to a predetermined change and thus said first value is subject to a change accordingly, said first value is replaced with a second value that is disposed between said first value after said change and said actual value such that said second value is set as said target value, and the reduction ratio of the continuously variable transmission is adjusted in such a direction as to bring said actual value into agreement with second value; and
   subsequently when a deviation of said actual value from said second target value becomes less than a predetermined value, said second value is replaced with a third value that varies from said second value to said first value such that said third value is set as said target value, and the reduction ration of the continuously variable transmission is adjusted in such a direction as to bring said actual value into agreement with said third value.

2. A ratio control as claimed in claim 1, wherein said second value is determined as a function of only vehicle speed at the moment when said load condition indicative signal is subject to said change.

3. A ratio control as claimed in claim 1, wherein said third value is given as a sum of said second value and a value that increases as time passes.

4. A ratio control as claimed in claim 1, where said third value is replaced with said first value when said third value exceeds said first value.

5. A ratio control as claimed in claim 1, wherein said third value is given as a sum of said second value and a value that varies as time passes.

6. A ration control as claimed in claim 5, wherein said third value is replaced with said first value when said third value exceeds said first value.

* * * * *